US012537856B2

(12) United States Patent
Narayan

(10) Patent No.: US 12,537,856 B2
(45) Date of Patent: Jan. 27, 2026

(54) RENDERING CONTEXTUAL SECURITY INFORMATION DETERMINED IN-BROWSER WITH WEB PAGES OF CLOUD AND SAAS VENDORS

(71) Applicant: Palo Alto Networks, Inc., Santa Clara, CA (US)

(72) Inventor: Krishnan Shankar Narayan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 302 days.

(21) Appl. No.: 17/806,079

(22) Filed: Jun. 9, 2022

(65) Prior Publication Data

US 2023/0403300 A1    Dec. 14, 2023

(51) Int. Cl.
*G06F 21/00* (2013.01)
*H04L 9/40* (2022.01)

(52) U.S. Cl.
CPC ................................. *H04L 63/20* (2013.01)

(58) Field of Classification Search
CPC . H04L 63/20; H04L 63/1483; H04L 63/1416; G06F 21/554; G06F 21/566; G06F 21/577
See application file for complete search history.

(56) References Cited

U.S. PATENT DOCUMENTS

| 8,527,881 | B2 | 9/2013 | Selig et al. | |
|---|---|---|---|---|
| 11,595,437 | B1* | 2/2023 | Mushtaq | H04L 63/1483 |
| 2008/0172382 | A1* | 7/2008 | Prettejohn | H04L 63/1483 |
| | | | | 707/999.009 |
| 2009/0144812 | A1 | 6/2009 | Sasamura et al. | |
| 2016/0294867 | A1* | 10/2016 | Tao | H04L 63/1416 |
| 2017/0054739 | A1* | 2/2017 | Wardman | H04L 63/1416 |
| 2019/0281059 | A1* | 9/2019 | Chittampally | G06F 16/953 |
| 2019/0384899 | A1* | 12/2019 | Brannon | G06F 21/316 |

(Continued)

OTHER PUBLICATIONS

PCT Application No. PCT/US2023/017859, International Preliminary Report on Patentability mailed May 15, 2024, 6 pages.

(Continued)

*Primary Examiner* — Michael M Lee
(74) *Attorney, Agent, or Firm* — Gilliam IP PLLC

(57) ABSTRACT

A browser extension produces a single view comprising content of web pages of a target vendor requested by a customer and corresponding security information for the target vendor maintained for the customer. Fingerprints of the target vendor's web page URLs and web page elements corresponding to resources, respectively, are determined. As the web browser retrieves web pages and the customer selects web page elements that identify resources, the browser extension matches URLs and/or HTML/XML syntactic patterns of the retrieved web pages to the fingerprints to determine the security information to obtain from back-end storage. The type/granularity of information that is retrieved can vary depending on the identified fingerprint match. The browser extension retrieves security information corresponding to fingerprints for which matches are identified, generates security overviews therefrom, and integrates the security overviews into the requested web pages to generate a consolidated, multi-perspective view.

22 Claims, 8 Drawing Sheets

(56) References Cited

U.S. PATENT DOCUMENTS

| | | | | |
|---|---|---|---|---|
| 2021/0176273 | A1* | 6/2021 | Hales | H04L 67/02 |
| 2021/0243174 | A1* | 8/2021 | Kaznocha | H04L 63/0815 |
| 2022/0053009 | A1* | 2/2022 | Sanchez | H04L 63/1425 |
| 2022/0060466 | A1* | 2/2022 | Parkinson | H04L 63/0869 |
| 2022/0414206 | A1* | 12/2022 | Hinkle | G06F 21/53 |

OTHER PUBLICATIONS

PCT Application No. PCT/US2023/017859, International Search Report mailed Jul. 3, 2023, 3 pages.
PCT Application No. PCT/US2023/017859, Written Opinion mailed Jul. 3, 2023, 6 pages.

* cited by examiner

FIG. 2

Storage Cl...

https://www.storage.cloudvendor.com/resources?region=us-west

SERVICES

STORAGE INSTANCES

NOTIFICATIONS ▼    User: lmetr41 →

Storage Instances (55)

| Name | Region | Access | Last Modified |
|---|---|---|---|
| storage-instance-A | US-East-4 | private | 2022/04/12 20:12:51 |
| storage-instance-B | US-West-1 | private | 2021/03/26 08:26:21 |
| storage-instance-C 〜203 | Asia-West-2 | private | 2022/03/26 13:48:46 |
| storage-instance-D | US-East-3 | custom | 2022/02/03 09:23:04 |
| storage-instance-E | US-West-3 | public | 2021/04/01 18:24:37 |
| storage-instance-F | US-Central-1 | private | 2022/04/15 06:30:25 |
| storage-instance-G | Asia-West-1 | public | 2022/03/08 15:50:46 |
| storage-instance-H | US-East-4 | private | 2022/01/18 15:24:34 |

SETTINGS   DELETE   VIEW HISTORY

205

201 —
SECURITY OVERVIEW
Select a resource to retrieve security insights

Resource Metadata ⎬ 207
Resource    storage-instance-C
Exposure    Private

Alerts ⎬ 209
Critical Severity   3
Medium Severity   1
Low Severity   0

Launch Remediation ⎬ 211

Write New Policy ⎬ 213
[          ]
SUBMIT

RENDERING CONTEXTUAL SECURITY INFORMATION DETERMINED IN-BROWSER WITH WEB PAGES OF CLOUD AND SAAS VENDORS

BACKGROUND

The disclosure generally relates to digital data processing (e.g., CPC subclass G06F) and to information retrieval (e.g., CPC subclass G06F 16/00).

Cloud service providers (CSPs) are providers of cloud computing technology that deliver computing resource in the cloud. With cloud computing, applications and other computing resources traditionally hosted on-premises are delivered by a CSP over the Internet. Cloud computing services provided by CSPs include Infrastructure-as-a-Service (IaaS), Platform-as-a-Service (PaaS), and Software-as-a-Service (SaaS), which provide cloud-based infrastructure, cloud-based platforms, and cloud-based applications, respectively. With the growing accessibility of cloud computing technology and the increasing prevalence of CSPs, an increasing number of vendors are adopting cloud computing technology for delivery of hardware technology and/or software technology in addition to or in lieu of offering on-premises solutions.

BRIEF DESCRIPTION OF THE DRAWINGS

Aspects of the disclosure may be better understood by referencing the accompanying drawings.

FIG. 2 is a conceptual diagram of an exemplary GUI depiction of a security overview integrated with a web page of a target vendor.

DESCRIPTION

Figure 1:
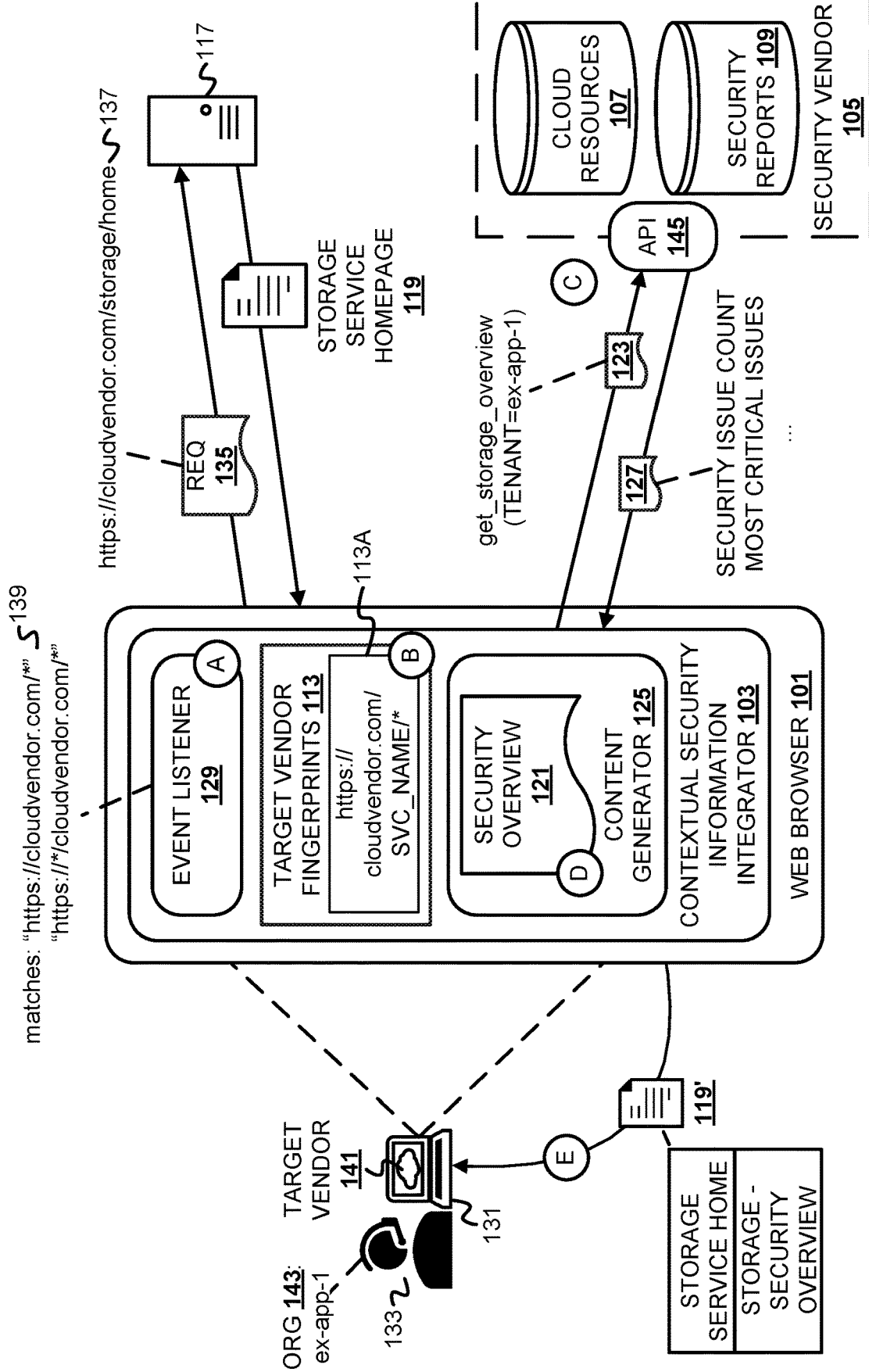
FIG. 1 is a conceptual diagram of integrating security information maintained by a security vendor with web pages of a cloud or cloud-based technology vendor.

The description that follows includes example systems, methods, techniques, and program flows that embody aspects of the disclosure. However, it is understood that this disclosure may be practiced without these specific details. For instance, this disclosure refers to generating security overviews for services offered by a CSP in illustrative examples. Aspects of this disclosure can be also applied to services, features, and/or other functionality offered by a SaaS application vendor/provider. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud" or "cloud environment," this description is referring to the resources of a CSP, also referred to as cloud resources. For instance, a cloud can encompass the servers, virtual machines, storage devices, and other cloud resources of a CSP. In more general terms, a cloud resource is a resource owned/managed by the CSP entity that is accessible via network connections. Often, the access is in accordance with an application programming interface (API) or software development kit provided by the CSP.

This description uses the phrase "browser extension" to refer to software for adding custom functionality to a web browser. Browser extensions can extend the functionality of a web browser through various APIs supported by the web browser. Different web browsers may use varying terminology to refer to software having these capabilities, such as "add-ons." As used herein, "browser extension" refers to the software used by any web browser for supporting web browser customization.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Security vendors are increasingly adapting to the shift towards cloud computing by providing cloud or SaaS security solutions to customers. Since the infrastructure underlying these cloud-based targets of protection (i.e., a SaaS application or cloud environment) are hosted offsite and owned by CSPs rather than being hosted on-premises by the customer, these security solutions utilize APIs offered by vendors of these cloud-based protection targets (hereinafter "target vendors") to obtain information about resources and applications being secured due to being offered by a third party. Security information obtained by the security vendor and consumed by the customer is stored in the security vendor's repositories and systems rather than alongside those of the target vendor. As a result, the customer has separate accounts and corresponding separate displays for both the target vendor (e.g., the CSP) and the security vendor. Navigating between the displays and through workflows to consume information about the cloud environment or SaaS application being secured and their associated security details can be cumbersome.

As described herein, a browser extension consolidates displays rendered by a web browser by integrating relevant information retrieved from the security vendor with web pages of the target vendor loaded by a web browser. The result is a single view of both the web pages of the target vendor that may be requested by the customer and corresponding security information for services and/or resources of the target vendor maintained by the security vendor for the customer, allowing for workflows to be consolidated to the single display rather than across multiple displays and browser sessions. To onboard a target vendor for compatibility with the browser extension, a plurality of fingerprints of the target vendor's web page URLs and web page elements are determined. The fingerprints can be URL patterns to which URLs of web pages requested by the customer can be matched or syntactic patterns of the web pages (e.g., in HyperText Markup Language (HTML) or Extensible Markup Language (XML) documents) that correspond to selectable and/or visible web page elements with which the customer can interact. Onboarding occurs once per target vendor so the fingerprints of the URLs and elements of the target vendor's web pages can be programmed into the browser extension for identification of services, resources, or other offerings of the target vendor used by the customer at runtime, with any updates to the target vendor's offerings represented in updates to the browser extension.

During a login session of the browser extension, the browser extension matches URLs and/or HTML/XML syntactic patterns in web pages retrieved by the browser to fingerprints to determine the associated security information to retrieve from the security vendor's backend storage system(s). The type and level of detail of information that the browser extension retrieves can vary depending on the fingerprint matched to a URL or HTML/XML syntactic pattern; the security information that is retrieved and rendered is thus determined based on context of the web page content determined from fingerprinting. For instance, when the browser extension identifies a fingerprint match for a homepage or summary view for the customer's account with the target vendor, the browser extension can retrieve general, high-level security information maintained for the account and generates a security overview for the customer's account that is rendered with the main/home page. Such information can include a total number of security issues identified by the security vendor for the customer's account with the target vendor, data/metadata about the last scan or security analysis performed for the customer's account with the target vendor, and the like. More detailed overviews can be generated when the customer selects a web page element corresponding to an individual resource provisioned to the customer (e.g., through hovering of the cursor). The browser extension detects these selection events, matches the selected element to a resource based on a corresponding syntactic pattern fingerprint, and retrieves data/metadata for the resource for generation of a security overview of that specific resource. Security overviews generated for the customer at any level of detail are rendered alongside the requested web pages to produce a consolidated, multi-perspective view.

Example Illustrations

FIG. 1 is a conceptual diagram of integrating security information maintained by a security vendor with web pages of a cloud or cloud-based technology vendor. A contextual security information integrator (hereinafter "the integrator") 103 is offered by a security vendor 105 and is implemented as a browser extension for a web browser 101 installed on a client device 131. The integrator 103 can communicate with backend components of the security vendor 105 via an API 145 exposed by the security vendor 105. The web browser 101 can be any web browser that supports browser extensions. The security vendor 105 may be a cloud platform or may be hosted on premises.

The integrator 103 determines and retrieves security information (i.e., security data and/or metadata) based on contextual information discerned from the content of web pages of a cloud or cloud-based technology vendor that is the protection target (hereinafter "target vendor") retrieved by the web browser 101 and incorporates the retrieved security information into a security overview that is rendered with the web pages for viewing in a single display alongside the web page content. The security information that the integrator 103 determines is said to be based on contextual information discerned from web page content because the integrator 103 performs "fingerprinting" of web page URLs and/or syntactic patterns to quickly determine the security perspective that is pertinent to the web page rather than fully parsing and scanning web page URLs and/or syntax. Target vendors can be CSPs or SaaS application vendors; in this example, a CSP that offers at least a storage service is a target vendor 141 of the integrator 103.

FIG. 1 assumes that a user 133 is a registered user of the target vendor 141 and belongs to an organization 143 named "ex-app-1" that is a tenant of the target vendor 141. For instance, the target vendor 141 may have allocated a virtual private cloud (VPC) to the organization 143 within a public cloud environment. FIG. 1 also assumes that the organization 143 is a tenant of/has an account with the security vendor 105, and the user 133 can access the integrator 103 (e.g., via logging in) following installation of the integrator 103 to a client device to which the web browser 101 is installed.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the integrator 103 detects an event that triggers security overview generation. The integrator 103 comprises an event listener 129, which may be implemented as a background script, that listens for security overview generation triggering events. Triggering events include retrieval and loading of web pages with URLs that match to a first of a set of URL patterns 139, which are generalized patterns of URLs of web pages of the target vendor 141. When the web browser 101 retrieves a web page of the target vendor 141 requested by the user 133 with an associated URL that matches one of the URL patterns 139, the integrator 103 should become active (i.e., program code of the integrator 103 should be executed). The URL patterns 139 can be defined in a manifest file associated with the integrator 103. The event listener 129 determines whether URLs of retrieved web pages match a first of the URL patterns 139 to determine whether security overview generation should be triggered. Triggering of security overview generation by the event listener 129 can be implemented as triggering execution of one or more content scripts of which the integrator 103 is comprised.

In this example, the user 133 requests access to a web page 119 of the target vendor 141 that is maintained by a server 117 (e.g., a physical or cloud-based web server) and has a URL 137, where the web page 119 is a homepage of a cloud storage service of the target vendor 141. The web browser 101 communicates a request 135 (e.g., a HyperText Transfer Protocol (HTTP) GET request) to the server 117 that indicates the URL 137 for retrieval of the web page 119. On retrieval of the web page 119 by the web browser 101, the event listener 129 identifies a match for the URL 137 to a first of the URL patterns 139. To illustrate, FIG. 1 depicts the URL 137 as "https://cloudvendor.com/storage/home", which the event listener 129 matches to a first of the URL patterns 139 comprising the pattern "https://cloudvendor.com/*".

At stage B, the integrator 103 determines the content to retrieve for inclusion in the security overview 121 based on identifying a match between the URL 137 and a fingerprint 113A defined for the target vendor 141. The integrator 103 has been preconfigured with a plurality of fingerprints 113 of the target vendor 141. The fingerprints 113 comprise predetermined URL patterns and/or syntactic patterns of the markup language (e.g., HTML or XML) of web pages of the target vendor 141. A fingerprint of a URL can comprise a URL pattern with a variable name(s) in the position of a name(s) of a service, feature, or other indication of web page content of the target vendor 141 in the URL. On identification of a match between a URL and a URL fingerprint, the integrator 103 can extract (e.g., copy) a substring of the URL corresponding to the position of the variable name in the matching fingerprint to determine the service/grouping to which the associated web page corresponds. A fingerprint of a syntactic pattern in markup language of a web page may be represented with a query or expression for identifying an element(s) of interest in web page markup language, such as an XML Path Language (XPath) expression and/or a jQuery selector for web pages comprising HTML/XML. Fingerprinting of URLs and/or syntactic patterns of retrieved web pages informs the integrator 103 of the content of web pages retrieved by the web browser 101. Matching to different ones of the fingerprints 113 can trigger execution different code units (e.g., routines/subroutines) of the integrator 103. As another example, each of the fingerprints 113 can indicate (e.g., via a pointer) the code unit(s) to be executed on identification of a match to the fingerprint.

On retrieval of the web page 119, the integrator 103 matches the URL 137 of the web page 119 to the fingerprint 113A, with the variable corresponding to the position of the service name matching the substring "storage" in the path of the URL 137. To illustrate, the fingerprint 113A depicted in FIG. 1 that the URL 137 matches is "https://cloudvendor.com/SVC_NAME/*", and the substring "storage" matches the position designated by the variable "SVC_NAME." The integrator 103 can be preconfigured with names of services of the target vendor 141 that can be matched to variable names in the fingerprints 113, including that the substring "storage" is indicative of the cloud storage service of the target vendor 141. The integrator 103 thus determines that the web page 119 corresponding to the URL 137 is associated with the cloud storage service offered by the target vendor 141.

At stage C, the integrator 103 queries one or more repositories of the security vendor 105 to retrieve security information maintained for the account with which the user 133 is associated. FIG. 1 depicts the security vendor 105 as maintaining a repository 107 and a repository 109 (collectively "the repositories 107, 109"), though security vendors may maintain any number of repositories, each of which can be implemented as databases, data lakes, data warehouses, etc. The repository 107 comprises data of cloud resources that the target vendor 141 has provisioned to the organization 143 and that the security vendor 105 has documented. The repository 109 comprises security reports that the security vendor 105 has generated for the organization 143 based on running security analyses. The repositories 107, 109 can comprise cloud resources and security reports corresponding to the organization 143 alone or can also comprise those of other tenants of the security vendor 105 depending on whether the security vendor 105 is a cloud-based service and is implemented with single-tenancy or multi-tenancy.

Each of the repositories 107, 109 can be queried through invocation of the API 145 published by the security vendor 105. The integrator 103 submits at least a first query 123 to the repository 107 and/or repository 109 by calling at least a first function of the API 145. The integrator 103 provides one or more parameter values with the function call corresponding to the query 123 that at least designate the tenant of the security vendor 105 (i.e., the identifier of the organization). To illustrate, FIG. 1 depicts the integrator 103 as calling an exemplary function of the API 145 named "get storage overview" that accepts the tenant name as a parameter and provides data and/or metadata comprising an overview of the security of the designated tenant's resources and use of the cloud storage service. The integrator 103 can determine the tenant name based on login session information for a login session initiated by the user 133 for logging in to use the browser extension by which the integrator 103 is implemented or based on one of the fingerprints 113 of where the tenant name is located and can be extracted from in HTML/XML of the web page 119.

In response to calling the API 145 function(s), the integrator 103 receives security information 127 for the security status of the cloud storage service of the target vendor 141 for the organization 143. Security information retrieved from the security vendor 105, which includes security data and/or metadata, may include a count of security issues that the security vendor 105 has identified for the organization 143 that are associated with the cloud storage service (e.g., for resources of the cloud storage service provisioned to the organization 143), an indication of the most critical security issues, etc. This example depicts the security vendor 105 as providing API 145 functions that, if invoked, return security overview data/metadata to the integrator 103; in other words, the security information 127 comprise overview-level or summarized/aggregated security data and/or metadata maintained for the use of the storage service by the organization 143. In implementations, API functions of security vendors may return the raw (i.e., non-overview) security data/metadata so that summarization, aggregation, or other preprocessing of data/metadata to generate an overview thereof is performed by the integrator 103 after receiving responses to API function invocations.

At stage D, the integrator 103 generates a security overview 121 for the storage service as used by the organization 143 to be rendered alongside the web page 119 content. The integrator 103 comprises a content generator 125 that generates content to be rendered by the web browser 101. The content generator 125 generates a security overview 121 comprising the security information 127 of the storage service. For instance, the content generator 125 may generate the security overview 121 by modifying the HTML/XML document of the web page 119 to include the security information 127 in the form of an overview. Generating the security overview 121 can also include aggregating, summarizing, or otherwise preprocessing at least a subset of the security information 127 for incorporation into the HTML/XML document. The content generator 125 can modify the web page 119 HTML/XML document via the web page Document Object Model (DOM) so the security overview 121 content is also rendered with the content of the web page 119 on a single screen (e.g., in a sidebar/side panel of the GUI). Modification of the web page 119 by the content generator 125 yields a security overview enhanced web page ("enhanced web page") 119', which comprises the web page 119 content and the security overview 121.

At stage E, the web browser 101 renders the enhanced web page 119' on a screen of the client device 131. As a result of rendering the enhanced web page 119', the content of both the web page 119 and the security overview 121 are displayed on the screen of the client device 131 in a single view. The user 133 can thus view the homepage of the cloud storage service of the target vendor 141 and an associated overview of the security status of the service for the organization 143 based on information collected and maintained by the security vendor 105 without navigating between multiple views and browser sessions, which creates a more convenient and intuitive experience for the user 133.

FIG. 2 is a conceptual diagram of an exemplary GUI depiction of a security overview integrated with a web page of a target vendor. With continued reference to FIG. 1, the exemplary GUI of FIG. 2 illustrates the integration of security information into a target vendor's web page with additional detail. In FIG. 1, the integrator 103 generates a security overview for a service of a target vendor used by a tenant and integrated the security overview into the service's homepage. As is depicted in FIG. 2, the integrator 103 can also retrieve and generate security overviews of individual resources of the target vendor that have been provisioned to the tenant for integration into the target vendor's web pages. This example assumes that the user 133 has requested a web page of the target vendor 141 that comprises a listing of cloud storage instances provisioned to the organization 143.

To perform resource-level security overview generation, the integrator 103 is preconfigured with events defined for user interaction with web page elements corresponding to individual resources. A web page element refers to a structural element(s) in the HTML/XML document of the web page represented with one or more tags. A web page element corresponding to an individual resource, such as resource 205 named "storage-instance-C" depicted in FIG. 2, can thus be represented with a particular structural element(s) in the corresponding HTML/XML document (e.g., a <div> tag). Events can thus be defined for structural elements or sequences thereof in HTML/XML documents that correspond to individual resources, where one or more of the fingerprints 113 represent the syntactic pattern(s) corresponding to the structural elements by which resources can be identified. An event defined for a structural element(s) that corresponds to a resource can be a mouseover/hover event, a click event, or a similar event that corresponds to selection of an element of the web page based on positioning of a cursor 203. Detection of an event defined for a structural element refers to the designated selection event occurring and invoking the integrator 103.

When the integrator 103 detects such a selection event, it determines an identifier of the resource that was selected based on the corresponding web page element. The integrator 103 can determine the resource identifier based on a fingerprint of a web page element(s) corresponding to a resource identifier. For instance, the fingerprints 113 can comprise one or more XPath expressions and/or jQuery selectors for evaluating the HTML/XML documents of web pages that produce values stored in HTML/XML nodes corresponding to individual resources as results. To illustrate, an example of a fingerprint 113A implemented with jQuery for nodes of an HTML/XML that comprise the text "EC2 Instance" and thus correspond to this type of cloud resource is "$("#instanceID").text( )=="EC2 Instance".

In this example, the integrator 103 evaluates the HTML/XML of the web page corresponding to the resource 205 following selection of the resource 205 via mouseover, clicking, etc. of the cursor 203 detected for the corresponding web page element. The integrator 103 can evaluate the HTML/XML of the web page based on an XPath expression, jQuery selector, or other expression for HTML/XML document manipulation that is triggered by the selection event. The result of the expression based on which the integrator 103 evaluates the HTML/XML document indicates that the resource identifier corresponding to the web page element for which the selection event was detected is "storage-instance-c." The integrator 103 invokes one or more functions of the API 145 to query for security data/metadata of the resource 205 that it maintains for the organization 143, where the submitted query(ies) at least comprises the determined resource identifier. The response(s) to the API invocation(s) comprise data/metadata that the security vendor 105 maintains for the resource 205.

On retrieval of the data and/or metadata of the resource 205, the integrator 103 generates a security overview 201 that is rendered with the web page. The integrator 103 can generate the security overview 201 by modifying the web page content via DOM manipulation to display the security overview 201 panel (e.g., in a side panel of the GUI) and incorporate the security data/metadata of the resource 205. The security overview 201 that the integrator 103 generates comprises resource metadata 207, an alerts overview 209, a remediation command 211, and a policy interface 213. These components of the security overview 201 are included as an example, and in implementations, other and/or different components can be included in security overviews.

The resource metadata 207 that is displayed comprises metadata of the resource 205 that the integrator 103 obtained from the security vendor 105. In this example, the resource metadata 207 include the identifier of the resource 205 and an indication of the network exposure of the resource determined by the security vendor 105 (e.g., based on prior security analysis of the resource 205). The alerts overview 209 comprises an overview of the alerts for security issues, such as vulnerabilities and/or misconfigurations of the resource 205, that have been identified for the resource 205 organized by count and severity rating (i.e., critical, medium, and low). The remediation command 211 is a web page element that can be selected by the user (e.g., clicked) to trigger remediation of the security issues identified for the resource 205 that are reflected in the alerts overview 209. For instance, selection of the GUI element corresponding to the remediation command 211 may invoke a function(s) of the API 145 that, when invoked for the resource 205, triggers a remediation playbook(s) for the resource 205 executed by the security vendor 105. The policy interface 213 comprises a text box from which the user can write a new policy for the resource 205 which, upon submission, is applied to the resource 205. For instance, selection of the GUI element corresponding to the submit option of the policy interface 213 may invoke a function(s) of the API 145 that communicates the contents of the text box and an indication of the resource 205 to a component of the security vendor 105 that manages policy creation and enforcement. As depicted by this example, when a user wants to view security information about the resource 205, the user can remain in the same browser session and view the security information in a single display rather than switching between displays as with conventional solutions.

The level of detail included in security overviews generated and rendered for resources can vary among implementations. FIG. 2 depicts an example in which the security overview 201 of the resource 205 comprises a high level overview of the details pertaining to security of the resource 205. For instance, when generating the security overview 201 with a high level overview of the security details, the function(s) of the API 145 that the integrator 103 invokes may provide a result(s) comprising raw data/metadata of the resource 205 and/or summarized, aggregated, or otherwise preprocessed data/metadata of the resource 205. In the case of the former, the integrator 103 may preprocess the retrieved data/metadata as part of generating a security overview 201. As an example, the security data of the resource 205 corresponding to the alerts overview 209 that the integrator 103 obtains may comprise indications of the alerts currently associated with the resource 205, including the alert severity and details of the alert. The integrator 103 can preprocess the alert data to determine aggregate counts of alerts of each severity rating and create the alerts overview 209 with the aggregate counts and severity ratings rather than the details of each individual alert. In other examples, the security data of the resource 205 obtained in response to invocation of the API 145 function(s) may comprise a summary view of the current alerts for the resource, so the integrator 103 can create the alerts overview 209 without additional preprocessing. A more detailed, lower-level security overview that the integrator 103 generates for the resource 205 may comprise at least a subset of the raw data/metadata retrieved for the resource 205, such as names or types of the alerts represented in the alerts overview 209 in addition to the severity ratings rather than the counts alone. The example GUI of FIG. 2 is depicted to aid in understanding. Implementations may instead display the raw data/metadata of resources or a combination of raw data/metadata and preprocessed data/metadata. Implementations may also retrieve and render different types of data/metadata.

FIGS. 3-6 are flowcharts of example operations for rendering contextual security information determined in-browser with web pages of CSPs and SaaS providers. The example operations are described with reference to a contextual security information integrator (hereinafter "the integrator") that is implemented as a browser extension or the security vendor that offers the integrator for consistency with the earlier figures. As used in the example operations, "the security vendor" refers to the entity that provides the integrator for installment, and the "target vendor" refers to a CSP or provider/vendor of a SaaS application. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 3:
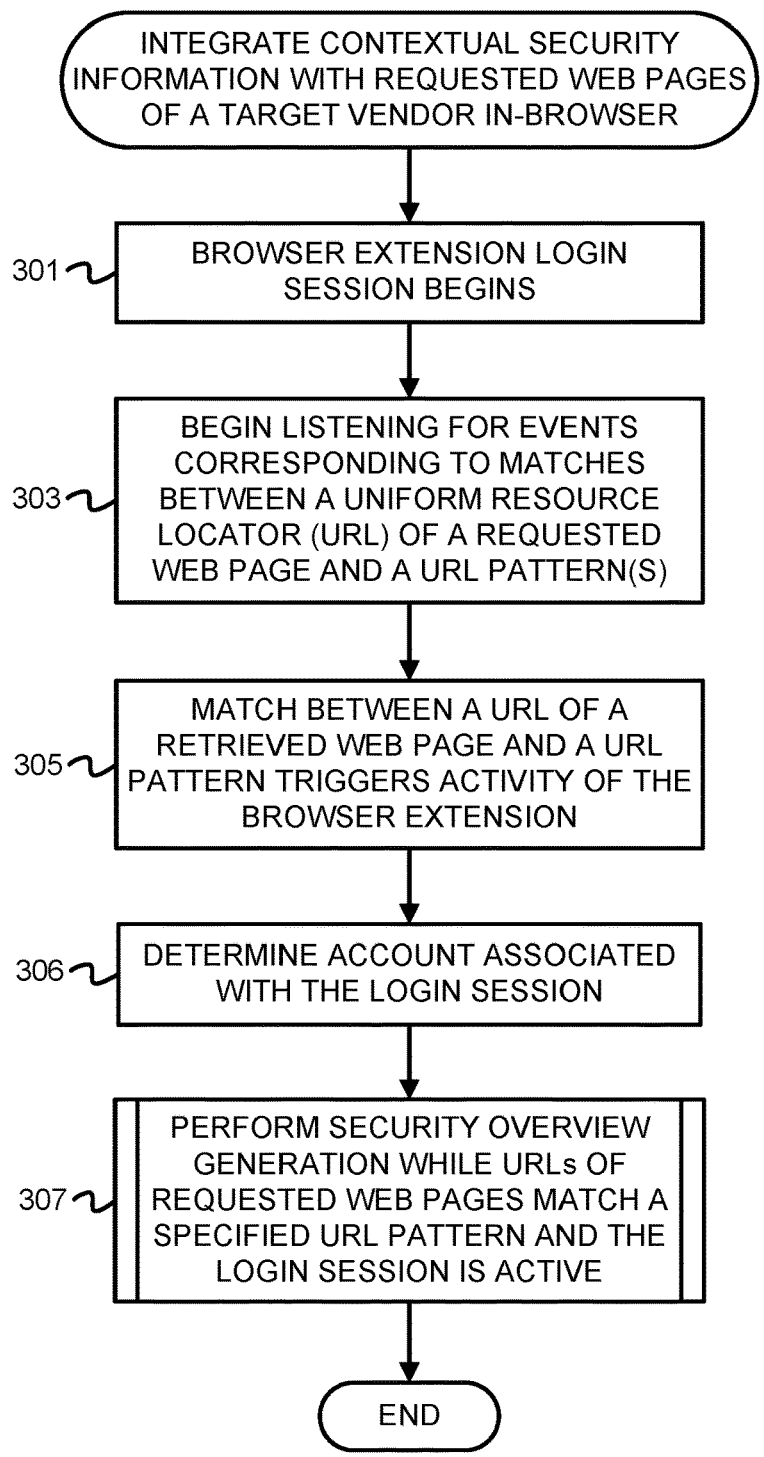
FIG. 3 is a flowchart of example operations for integrating contextual security information with requested web pages of a target vendor in-browser.

FIG. 3 is a flowchart of example operations for integrating contextual security information with requested web pages of a target vendor in-browser. The security information that is contextual for a requested web page is dependent on both the security vendor account with which the requestor is associated and the content of the web page. The example operations assume that the integrator has been preconfigured with a plurality of fingerprints of the target vendor, where the fingerprints can be URL fingerprints and/or HTML/XML syntactic pattern fingerprints.

At block 301, a browser extension login session begins. The login session begins when a user having an account with the security vendor that offers the integrator logs into the browser extension. The login session information can include username and password or may additionally include an account or tenant name (e.g., the name of the organization with which the user is registered).

At block 303, the integrator begins listening for events corresponding to matches between a URL of a requested web page and a specified URL pattern. When the login session begins, a background script of the integrator begins listening for events that trigger activity of the integrator, where activity of the integrator includes execution of non-background scripts (e.g., a content script(s)). The integrator has been preconfigured with one or more patterns (e.g., in a browser extension manifest file) of URLs associated with the target vendor that trigger activity of the integrator upon matching a URL of a web page to a pattern. An event that triggers activity of the browser extension is thus matching a URL of a retrieved web page to a URL pattern maintained by the integrator.

At block 305, the integrator matches a URL of a retrieved web page to a URL pattern, which triggers activity of the browser extension. The integrator identifies the match based on applying the URL pattern(s) to the URL of the web page retrieved by the browser. Matching the URL to the URL pattern triggers activity of the browser extension (i.e., execution of the content script(s)). The identified match may often be an account homepage retrieved and displayed to users of the target vendor following successful login.

At block 306, the integrator determines the account that is associated with the login session. Account determination is performed to determine an identifier(s) of the account known by the security vendor for which security information should be retrieved (e.g., a tenant name/identifier, account identifier, etc.). The integrator can determine the account based on account information associated with the maintained login session. Alternatively, or in addition, the account information may be located on the retrieved web page. The integrator can determine the account information by evaluating the web page HTML/XML document based on a predetermined XPath expression(s), jQuery selector(s), or other expression that describes the location of account information in the HTML/XML documents of web pages of the target vendor.

In implementations, the integrator may verify that the account with the target vendor with which the user is associated is known by the security vendor before proceeding. An account is known by the security vendor if the security vendor is actively performing security monitoring of the services and resources of the target vendor associated with the account. For instance, the integrator can query backend storage of the security vendor to determine whether the account with the target vendor is being monitored by the security vendor. If the account is not being monitored, the integrator may present a prompt to the user requesting confirmation as to whether the user would like to onboard the account with the security vendor for security monitoring. If an input indicating the affirmative is received, the integrator triggers onboarding of the account with the target vendor before proceeding to block 307. Onboarding can be triggered by invoking a function(s) of the security vendor's API that triggers requests of any pertinent permissions from the user, initiating a scan of the account's resources, etc.

At block 307, the integrator performs security overview generation while URLs of requested web pages match a URL pattern that triggers browser extension activity and while the login session is active. While these conditions are satisfied, the integrator generates security overviews tailored to web page content based on detection of triggering events. Triggering events can include retrieval of web pages by the web browser. Security overview generation that is triggered by retrieval of a web page can be implemented as described in reference to FIG. 4. Alternatively, or in addition, triggering events can also include selection of web page elements (e.g., based on user interaction with GUI elements) that trigger an action. Security overview generation that is triggered by selection of a web page element can be implemented as described in reference to FIG. 5.

Figure 4:
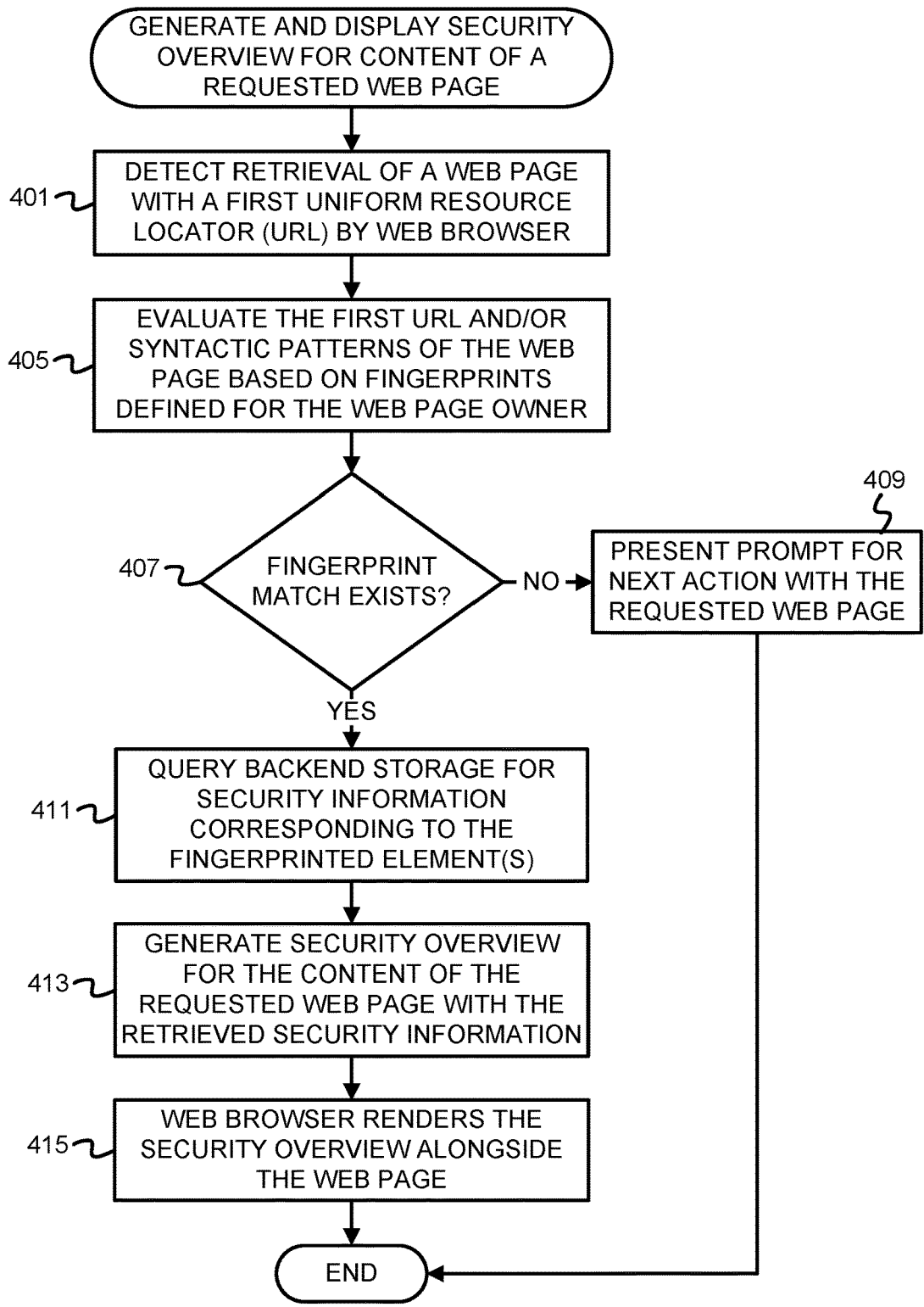
FIG. 4 is a flowchart of example operations for generating and displaying a security overview for content of a requested web page.

FIG. 4 is a flowchart of example operations for generating and displaying a security overview for content of a requested web page. At block 401, the integrator detects retrieval of a web page with a first URL by the web browser. The first URL may be the URL of the retrieved web page for which the pattern match was identified at block 305 or may be a URL of a subsequently-retrieved web page. The integrator may detect retrieval of the web page based on receipt of a response comprising the web page content (e.g., a response to an HTTP GET request). Alternatively, or in addition, the integrator may detect retrieval of the web page based on detecting that the browser has retrieved the web page HTML/XML document and the document is accessible for manipulation via the DOM of the web page. The integrator can determine the URL of the retrieved web page by calling a function of an API offered by the web browser or browser extension platform.

At block 405, the integrator evaluates the first URL and/or syntactic patterns of the web page based on fingerprints defined for the web page owner (i.e., the target vendor). The integrator maintains one or more fingerprints of web page HTML/XML syntactic patterns and/or URLs so that web pages can be "fingerprinted" to determine the content of the web page. The fingerprints have been predetermined for web pages of the target vendor as is described below in reference to FIG. 6. Each fingerprint corresponds to a type of security overview that should be generated. Fingerprinting thus informs the integrator of the security information to retrieve for generating a security overview for a web page. Web page content that can be determined from fingerprinting can be a general account overview presented on login or information about a particular service of the target vendor (e.g., different services of a CSP).

Fingerprints can be implemented in two forms: URL fingerprints or markup language fingerprints. URL fingerprints may comprise URL patterns with variable names that match to the URL substring that indicates the web page content (e.g., the service name). To illustrate, referring to FIG. 1, a URL fingerprint for identifying the CSP service corresponding to a web page may be "https://cloudvendor.com/SVC_NAME/*", where the substring matching to the position of "SVC_NAME" indicates the name of the service corresponding to the web page. The integrator can evaluate the web page URL based on a URL fingerprint(s) by determining whether a match between the URL and a URL fingerprint can be identified. Markup language fingerprints may comprise XPath expressions, jQuery selectors, and/or other expressions for HTML/XML document manipulation describing the node(s) of the DOM tree or other tree representation (e.g., the HTML DOM tree) created for the web page's HTML/XML document whose value(s) is indicative of the web page content.

At block 407, the integrator determines whether a fingerprint match can be identified. A fingerprint match can be identified if the URL of the web page matches a first URL fingerprint and/or evaluation of the HTML/XML document of the web page based on an XPath expression(s), jQuery selector(s), or other expression(s) yields a value (i.e., a node described by an XPath expression, jQuery selector, or other expression exists in the tree representation of the HTML/XML document). If a fingerprint match cannot be identified, operations continue at block 409. If a fingerprint match can be identified, operations continue at block 411.

At block 409, the integrator presents a prompt for the next action with the requested web page. Lack of a fingerprint match may indicate that the security vendor does not yet monitor the service of the target vendor corresponding to the web page for the account. The integrator may display (e.g., by modification of the web page via the DOM) a prompt requesting input as to whether the user wants to monitor the service corresponding to the web page. On receipt of input indicating the affirmative, the integrator may communicate a request to the backend security monitoring systems(s) to begin the process for monitoring the service (e.g., via calling a function(s) of an API of the backend system).

At block 411, the integrator queries backend storage of the security vendor for security information corresponding to the fingerprinted element(s). The backend storage may be one or more repositories, databases, data lakes, or other types of data storage that have exposed an API. The query(ies) that the integrator submits to the backend storage may indicate the account information determined at block 403 (e.g., a tenant name/identifier) and one or more types of security information (i.e., data and/or metadata) to be retrieved. The type(s) of security information indicated in the query(ies) can vary depending on the fingerprint for which the match was identified. For instance, identification of different fingerprint matches can trigger invocation of different functions of the API for retrieval of corresponding security information, such as based on the fingerprints each corresponding to a code unit(s) (e.g., a routine(s)/subroutine(s)) to be invoked on identification of a fingerprint match. To illustrate, if the target vendor is a CSP and the fingerprinted element corresponds to a particular service of the CSP, the integrator can query the backend storage for security information maintained for the account that is associated with that service via an API function invocation(s). Examples of such security information include a total number of security issues identified for the account that correspond to the service (e.g., security issues identified for resources corresponding to the service) and/or a listing of the most critical security issues. On retrieval of security information, the integrator may cache security information for a configurable number of security overview generation events (e.g., five generation events). Caching of security information facilitates rapid retrieval of security information corresponding to frequently-retrieved web pages, such as those corresponding to services used frequently by the user(s) associated with the account.

At block 413, the integrator generates a security overview for the content of the web page with the retrieved security information. The integrator generates a GUI depiction of the retrieved security information that is displayed alongside the web page. The integrator can generate the GUI depiction by modifying the web page via the web page DOM. The security information retrieved from the backend storage may already comprise overview information and can be incorporated directly into the GUI depiction. As another example, the integrator can preprocess at least a subset of the security information before incorporating the subset of security information into the GUI depiction. For instance, the integrator can aggregate and/or generate a summary of a subset of the security information and incorporate the aggregated or summarized security information into the GUI depiction. The integrator modifies the document(s) of which the web page is comprised via the DOM to incorporate the security information and/or the preprocessed security information.

For instance, the integrator can add and/or modify HTML/XML and/or Cascading Style Sheets (CSS) documents via the DOM so the added and/or modified document(s) will be rendered.

At block 415, the web browser extended by the integrator renders the security overview alongside the web page. The security overview is integrated into the content rendered onto the screen of the client device on which the web browser is installed. As a result, the security overview is available for viewing alongside the web page content.

Figure 5:
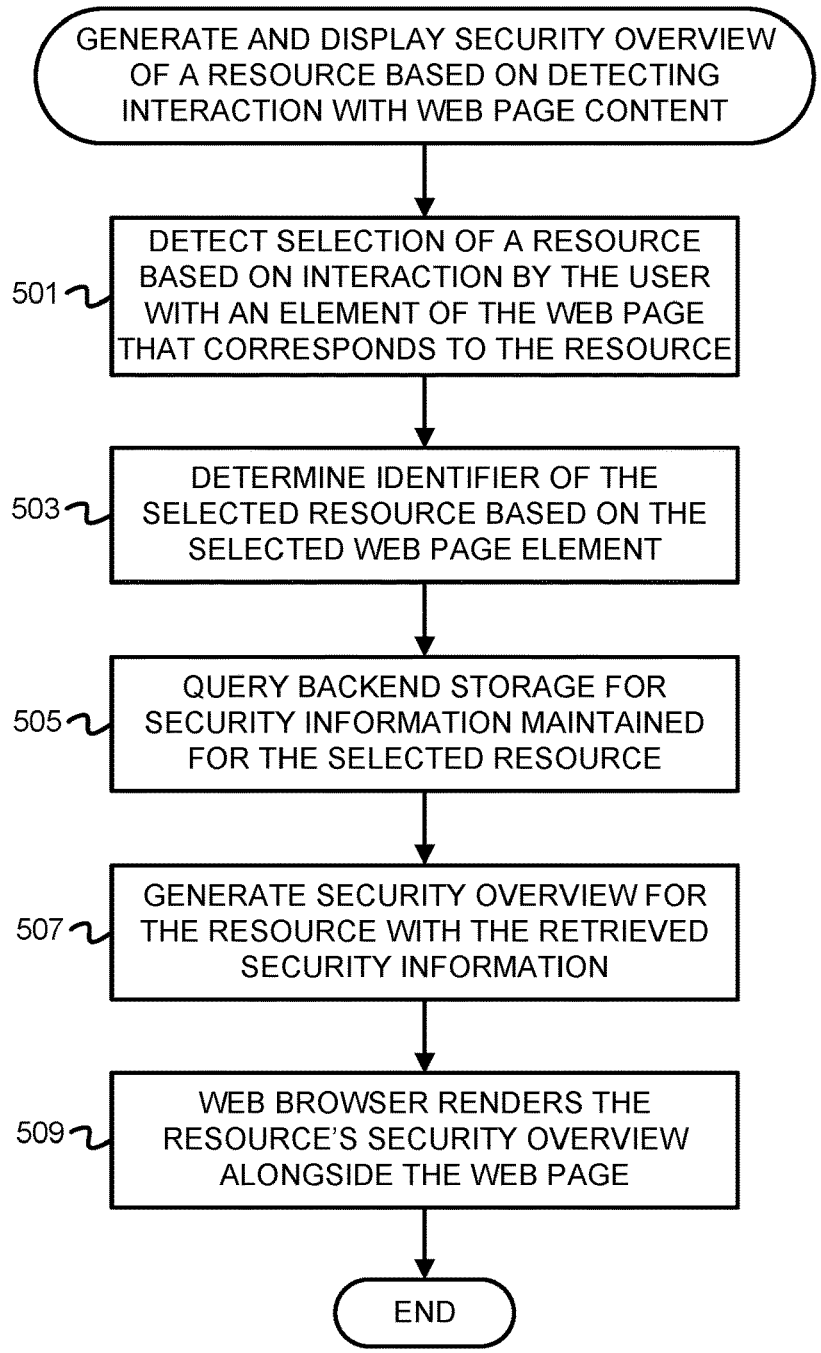
FIG. 5 is a flowchart of example operations for generating and displaying a security overview of a resource based on detecting interaction a web page element.

FIG. 5 is a flowchart of example operations for generating and displaying a security overview of a resource based on detecting interaction a web page element. The example operations assume that a web page has already been rendered by the web browser, so a user can interact with GUI elements corresponding to elements of the web page.

At block 501, the integrator detects selection of a resource based on interaction by the user with an element of the web page that corresponds to the resource. The integrator has one or more events (e.g., HTML events such as onmouseover and/or onclick events) defined for web page elements corresponding to individual resources that are thus treated as selection events of the resources. Web page elements that correspond to individual resources and have an event defined can be the web page element(s) that comprises an HTML/XML attribute with a resource identifier as a value. The integrator detects selection of a resource when a defined event occurs and triggers execution of program code of the integrator corresponding to the event.

At block 503, the integrator determines an identifier of the selected resource based on the selected web page element. The integrator fingerprints the HTML/XML document corresponding to the web page to determine the resource identifier based on a syntactic pattern that has been predetermined to correspond to the location of a resource identifier(s) in the web page's HTML/XML. To fingerprint the HTML/XML document, the integrator may have XPath expressions and/or jQuery selectors defined in association with the resource selection events, where an XPath expression or jQuery selector describes/selects a node of the HTML/XML document (e.g., in a tree representation of the document) that comprises an attribute value corresponding to an identifier of the selected resource. The integrator determines the node comprising the resource identifier as an attribute value based on evaluation of the web page element for which the detected event was defined with the XPath expression or jQuery selector. From the determined node comprising the attribute value, the integrator can extract the resource identifier.

At block 505, the integrator queries backend storage of the security vendor for security information maintained for the selected resource. As described above in reference to FIG. 4 at block 411, the backend storage may be one or more repositories, databases, data lakes, or other types of data storage that have exposed an API. The query(ies) that the integrator submits to the backend storage may indicate the account information determined for the login session and the resource identifier. The query(ies) may also specify one or more types of security information to be retrieved for the resource. To illustrate, if the target vendor is a CSP and the selected resource is a cloud resource, the integrator can query the backend storage for data and/or metadata maintained for the cloud resource via an API function invocation(s). Examples of such data and/or metadata include a count of security issues identified for the cloud resource (e.g., misconfigurations and/or vulnerabilities of the cloud resource) and/or a count of security issues identified for the cloud resource per classification of severity. On retrieval of security information for the resource, the integrator may cache the security information for a configurable number of security overview generation events. Caching security information of resources facilitates rapid retrieval of security information corresponding to frequently-interacted with web page elements corresponding to resources, such as those corresponding to high-use and/or publicly exposed resources.

At block 507, the integrator generates a security overview for the resource with the retrieved security information. The integrator generates a GUI depiction of the retrieved security information that is displayed alongside the web page. The integrator can generate the GUI depiction by modifying the web page via the web page DOM. The security information retrieved from the backend storage may already comprise overview-level security information of the resource and can be incorporated directly into the GUI depiction. As an alternative, the integrator can preprocess at least a subset of the security information before incorporating it into the GUI depiction. For instance, the integrator can aggregate and/or generate a summary of a subset of the security information and incorporate the aggregated or summarized subset of security information into the GUI depiction. An example is determining a count of security issues associated with the resource based on retrieving the security issue data from the backend storage. The integrator modifies one or more documents of which the web page is comprised via the DOM to incorporate the security information and/or the preprocessed security information of the resource. For instance, the integrator can add and/or modify HTML/XML, and/or CSS documents via the DOM for rendering of the added and/or modified document(s).

The integrator can include elements in addition to the security overview in the content to be rendered for the selected resource. For instance, the integrator can also incorporate into the content to be rendered a web page element(s) accepting input corresponding to actions to be taken on the selected resource by the security vendor. For instance, the integrator can incorporate a selectable HTML/XML element (e.g., a button) in the content to be rendered that the user can select to trigger remediation of the security issues identified for the resource. Selection of this element triggers a function invocation(s) of the security vendor's API to launch a remediation workflow (e.g., a playbook(s)) for the resource. Alternatively, or in addition, the integrator can incorporate an HTML/XML element into which a policy to be applied to the resource can be typed and submitted (e.g., a text box and corresponding button to submit the text box contents). Submission of policies via this element triggers a function invocation(s) of the security vendor's API to launch a workflow for policy creation and enforcement. As a result, remediation of misconfigured or vulnerable resources and/or creation of policies to enforce for resources can be initiated in-browser without navigating to a different browser session and display.

At block 509, the web browser renders the resource's security overview alongside the web page. The security overview is integrated into the content rendered onto the screen of the client device on which the web browser is installed. As a result, the security overview is available for viewing alongside the web page content corresponding to a resource that the user has selected.

Figure 6:
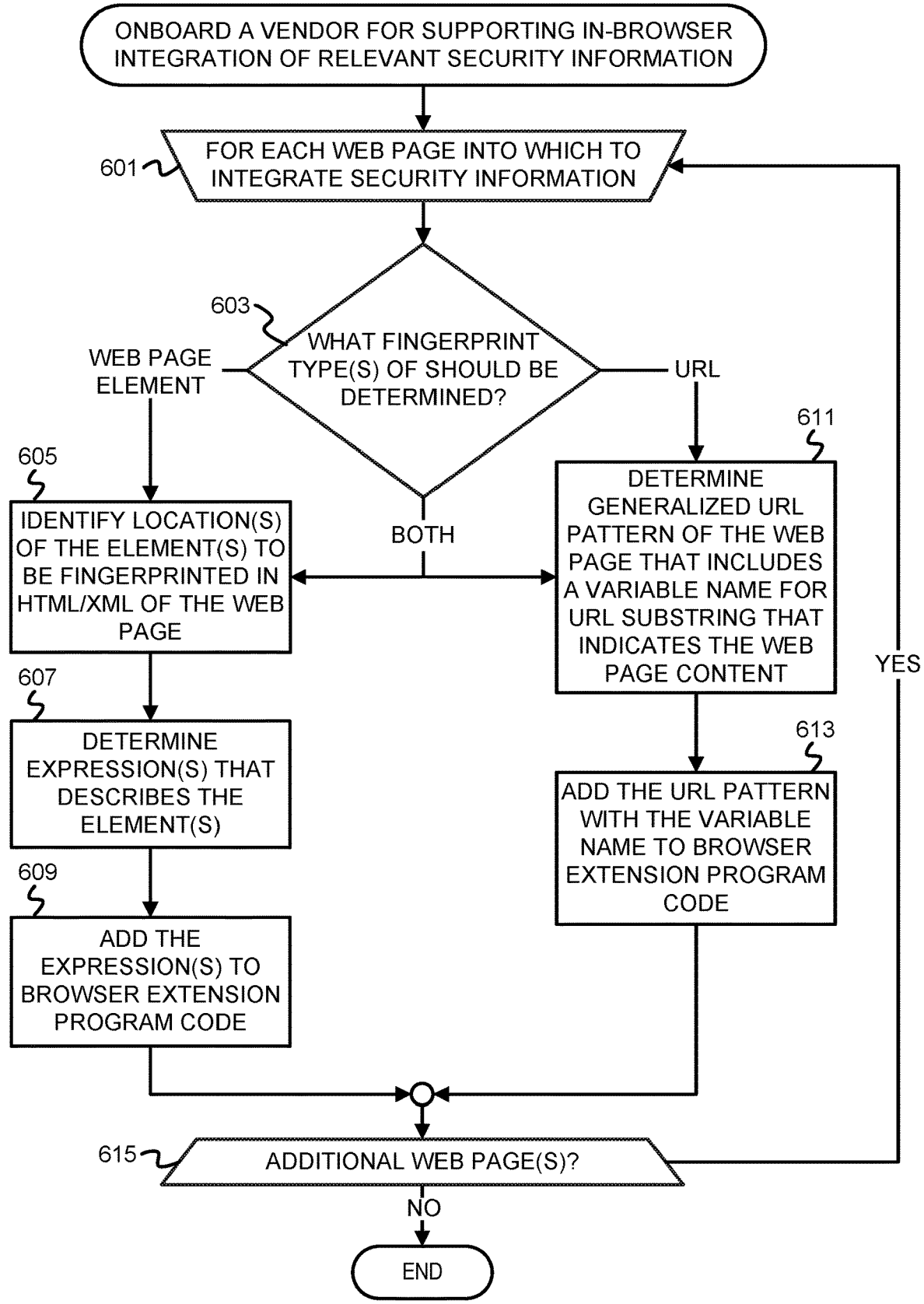
FIG. 6 is a flowchart of example operations for onboarding a vendor for supporting in-browser integration of security overviews based on web page content.

FIG. 6 is a flowchart of example operations for onboarding a vendor for supporting in-browser integration of security overviews based on web page content. The example operations are performed once per target vendor to make a target vendor secured by the security vendor compatible with the browser extension comprising the integrator. As a target vendor begins to offer new services and/or new resource types, the example operations can be performed when generating corresponding updates to the integrator to support the updates published by the target vendor. The security vendor can perform the example operations based on expert knowledge or domain knowledge and as part of developing the integrator.

At block 601, the security vendor begins fingerprint determination for each web page for which security information is to be integrated. One or more URLs can be predetermined that correspond to the web page(s) to be enhanced with security information. Each web page is retrieved via its URL and made available for analysis and processing (e.g., through developer tools offered by the web browser(s) for which the browser extension is being offered). Since the specific content of web pages can vary across accounts with the target vendor, the web page may be generic or representative of the general structure of the web page HTML/XML document. Additionally, while the subsequent operations refer to a single web page, some sets of web pages (i.e., two or more web pages) may correspond to a same service or other grouping, such as a set of web pages for which a single URL fingerprint is to be determined. In such cases, the subsequent operations can be performed for the set of web pages.

At block 603, the security vendor determines a type(s) of fingerprint(s) to determine for the web page. A fingerprint of a web page element(s) defined in terms of a syntactic pattern (e.g., of HTML/XML structural elements), a URL, or both can be determined. If at least a first web page element fingerprint should be determined, operations continue at block 605; if multiple web page element fingerprints are to be determined, the subsequent operations are performed for each of the web page elements. If the URL of the web page should be fingerprinted, operations continue at block 611.

At block 605, the security vendor identifies a location of at least a first element to be fingerprinted in the HTML/XML document of the web page. A tree representation of the HTML/XML document, such as a DOM tree, can first be created based on processing the HTML/XML document. The location of the element is identified based on the corresponding node in the tree representation of the HTML/XML document. Since elements of web pages can be dependent on the account for which a login session with the target vendor has been established, such as elements corresponding to specific resources provisioned for the account, the location in the tree representation can be generalized to a path of nodes (e.g., the "branch" of the tree) from which nodes corresponding to the resources will be added.

At block 607, the security vendor determines an expression that describes the location of the element in the HTML/XML document. The expression may be an XPath expression, a jQuery selector, or another expression type that can be used for manipulating HTML/XML documents (e.g., an expression/function provided by an open-source library for HTML/XML DOM tree traversal and manipulation). The expression describes at least a first node in the tree representation that corresponds to the web page element. The node described by the expression can be a node corresponding to an HTML/XML attribute of the web page element that will store a value of interest (e.g., a resource identifier). As an example, the expression can describe a node comprising the name attribute of a <button> element or another visible/selectable element.

At block 609, the security vendor adds the expression to program code of the browser extension. The expression is added in program code that executes based on detection of a triggering event to extract the information from the web page content that is identified based on evaluating the expression against the web page HTML/XML document (e.g., through traversal of the HTML/XML DOM tree based on the expression); generally, this triggering event is retrieval of a web page having a certain URL (i.e., a URL matching to a URL fingerprint) or interaction with a GUI element corresponding to the web page element.

At block 611, the security vendor determines a generalized pattern of the URL web page that includes at least a first variable name for URL substring indicative of the web page content. The URL pattern generalizes the URL to reflect the content of the web page irrespective of the specific account that requests that web page. The pattern can comprise asterisks for the specific account information and include the variable name(s) in the position of a substring(s) of the URL (e.g., in the URL path) that corresponds to a name of a service or other indication of the web page's content. As an example, referring to FIG. 1, the URL "https://cloudvendor.com/storage/home" can be generalized to the pattern "https://cloudvendor.com/SVC_NAME/*" to reflect that the substring matching to the variable name "SVC_NAME" indicates the service of the target vendor corresponding to the web page. As another example, the URL "https://cloudvendor.com/storage/home?region=us-east" can be generalized to the pattern "https://cloudvendor.com/SVC_NAME/*region=REGION" to reflect that the substrings matching to the variable names "SVC_NAME" and "REGION" indicate the service of the target vendor corresponding to the web page and the region to which the instance of the service corresponds, respectively.

Additionally, a rank or priority can be determined for the URL pattern and variable name(s) to handle the case in which a URL matches to multiple URL patterns. The ranking or priority assigned to a URL pattern can denote the URL pattern to which the integrator is to match a URL at runtime if there are multiple possible matches for the URL. An example of a ranking/priority scheme that may be implemented is one in which URL patterns are assigned to ranked tiers, where one or more URL patterns are assigned to each tier, and the integrator performs URL pattern matching for URL patterns in each tier in decreasing rank order. For this example, the security vendor determines a tier to assign the URL pattern.

At block 613, the security vendor adds the URL pattern with the variable name to the browser extension program code. The URL pattern is added in a set of URL patterns to which the integrator attempts to match URLs of retrieved web pages. If a rank or priority was determined for the URL pattern, an indication of the rank or priority is also added to the browser extension program code. Matching a URL to a first of the patterns further triggers generation of a security overview of a type corresponding to the matched URL pattern, such as based on the variable name indicative of the web page content. For instance, matching a URL to a first of the patterns having a variable name corresponding to a service of the target vendor can trigger generation of a security overview for the account's use of that service.

At block 615, operations proceed if there is another web page(s) remaining for fingerprinting. If an additional web page(s) is remaining, operations continue at block 601. Otherwise, operations are complete.

FIGS. 1-6 relate to implementations in which contextual security information integration is performed based on the browser extension implementing the contextual security overview integrator (referred to above as "the integrator 103") determining the content of web pages after they are retrieved and fingerprinted. In this case, the assumption is that the target vendor does not provide native support for integration of contextual security information. Some target vendors may natively support in-browser integration of contextual security information. With native support of in-browser contextual security information integration, the browser extension implementing the integrator 103 can "hook into" web pages of the target vendor via hooking. In such implementations, the target vendor web pages for which security information is to be integrated comprise one or more code hooks provided by the target vendor, or locations in the program code at which execution is intercepted by the integrator 103 for retrieval of security information that is pertinent to the web page and perform any pre-processing before the web page and security overview comprising the retrieved security information is rendered. Because the integrator 103 can execute in the same context of the web page program code rather than as an external entity, the integrator 103 can then directly determine the service, resource, or other content of the web page for which corresponding security information should be retrieved. In other words, this information can be directly determined from web page elements that are accessible to the integrator 103 rather than indirectly through fingerprinting as described above.

Figure 7:
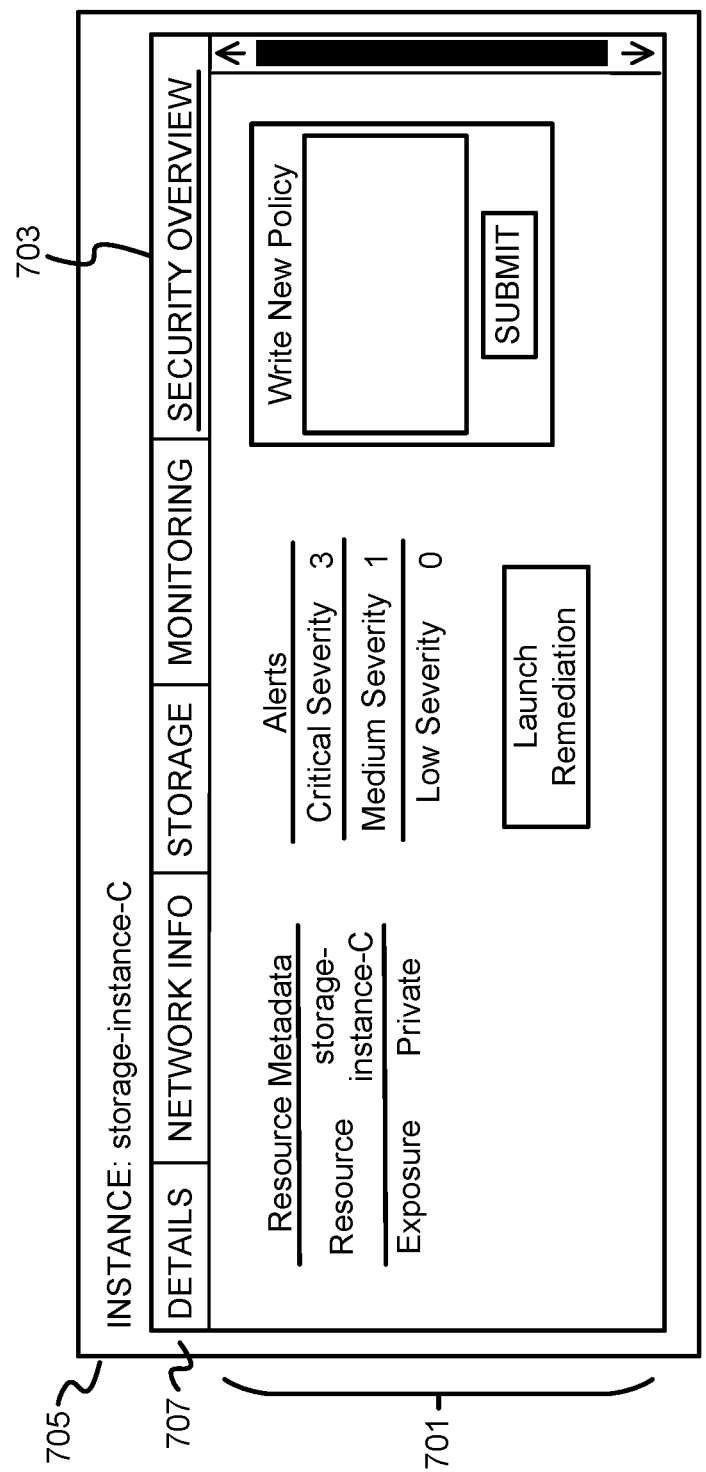
FIG. 7 depicts an exemplary GUI depiction comprising information about a selected resource in instances where the target vendor natively supports in-browser integration of contextual security information.

FIG. 7 depicts an exemplary GUI depiction comprising information about a selected resource in instances where the target vendor natively supports in-browser integration of contextual security information. With continued reference to FIG. 1 and additional reference to FIG. 2, the GUI depicted in FIG. 7 is an example of the resulting screen following selection (e.g., clicking) of a GUI element corresponding to the resource 205. In this example, since the target vendor supports the integration of security information retrieved by the integrator 103, security overviews that the integrator 103 generates can be displayed with the content of the corresponding web pages of the target vendor instead of in a separate GUI element as in FIG. 2. To illustrate, a detailed view 705 of the resource 205 comprises a plurality of tabs 707 between which the user can navigate to view various details about the resource 205. The tabs 707 comprise a security overview tab 703 in addition to other tabs conventionally supported by the target vendor. Selection of the security overview tab 703 results in the security overview 701 that the integrator 103 generated for the resource 205 being displayed. As illustrated by the detailed view 705 of the resource 205, if the target vendor natively supports integration of contextual security information in-browser, security overviews can be incorporated as part of the web page content and are rendered therewith.

Further, the type and/or granularity of security information that is retrieved and rendered with in-browser security information integration may also be customizable by customers whether the functionality of the integrator 103 is offered as an external browser extension or is natively supported by the target vendor (as depicted in FIG. 2 and FIG. 7, respectively). For instance, with reference to FIG. 7, the customer to whom the resource "storage-instance-C" has been provisioned may have configured the integrator 103 to display resource metadata, an alert overview, a remediation command, and a policy interface in the security overview tab 703 corresponding to a selected resource. Other customers may elect to display more or less information about individual resources and can configure the integrator 103 accordingly.

The integrator 103 may be further configurable to incorporate different elements and/or types or granularities of security information into security overviews generated and rendered for users with different roles assigned by the customer (e.g., by a system administrator of the customer). For instance, on commencement of a login session, the integrator 103 may determine a role of the user for whom the login session is being maintained (e.g., based on an organization directory accessible to the integrator 103). The integrator 103 can be configured with additional policies designating user roles and, for each role, one or more types of security information and/or one or more GUI elements that are to be incorporated into security overviews that are rendered during the login session. To illustrate, with reference to FIG. 2, the integrator 103 may be configured with a policy to retrieve and display the resource metadata 207 for users with any role and another policy to retrieve and display the alerts overview 209 for users with more privileged roles. As another example, the integrator 103 may be further configured with a policy dictating that the remediation command 211 and policy interface 213 should be incorporated in security overviews for users having roles with the highest level of privileges.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
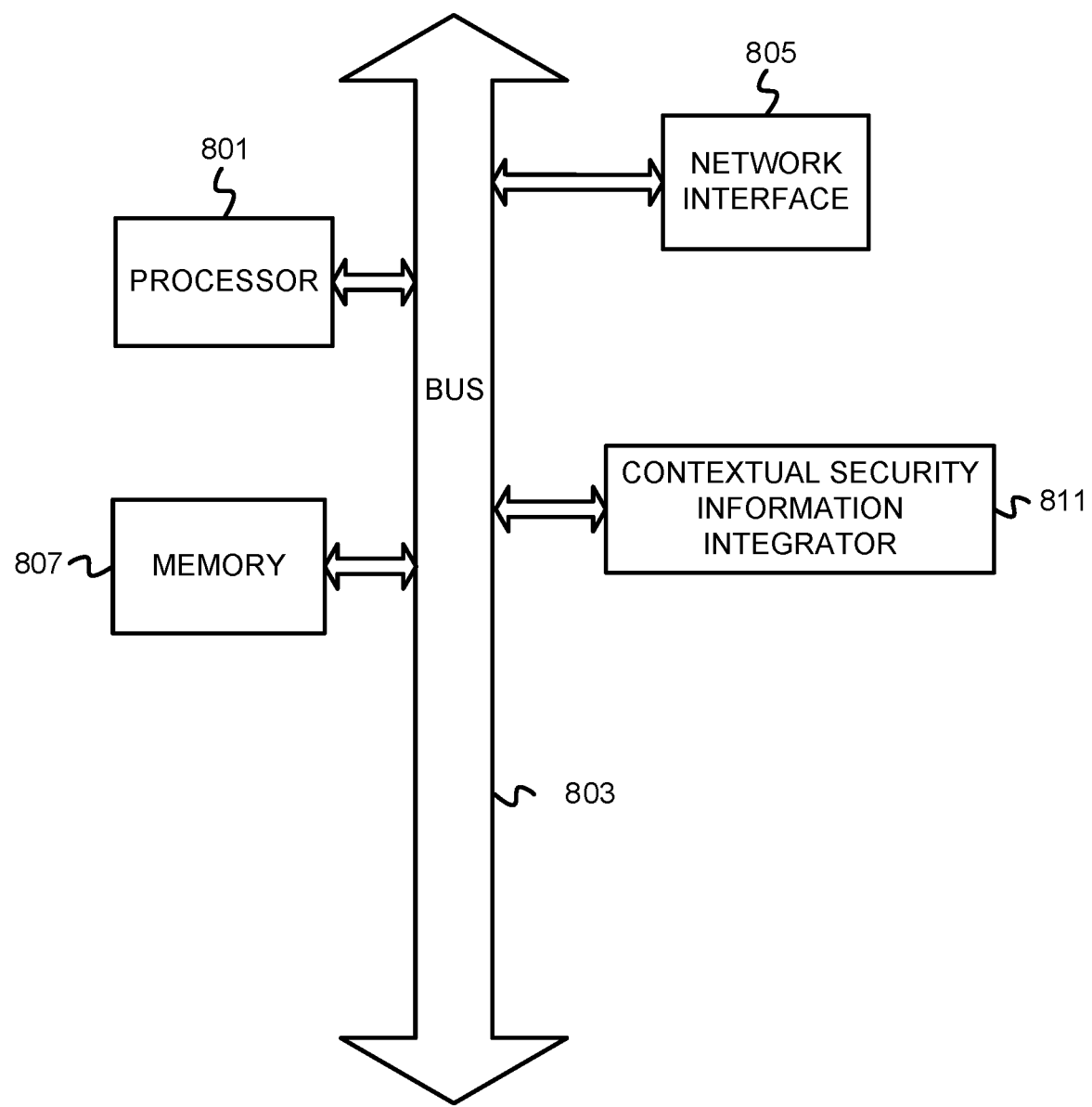
FIG. 8 depicts an example computer system with a contextual security information integrator.

FIG. 8 depicts an example computer system with a contextual security information integrator. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes contextual security information integrator 811. The contextual security information integrator 811 can perform in-browser integration of contextual security information that is relevant to the content of retrieved web pages. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

While the aspects of the disclosure are described with reference to various implementations and exploitations, it will be understood that these aspects are illustrative and that the scope of the claims is not limited to them. In general, techniques for rendering contextual security information determined in-browser with web pages of CSPs and SaaS providers as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
   integrating, by a browser extension provided by a security vendor, security information maintained by the security vendor for an account with a target vendor with requested web pages of the target vendor, wherein integrating security information maintained by the security vendor with requested web pages of the target vendor comprises, by the browser extension,
   detecting a request for a first web page of the target vendor during a login session of the account with the target vendor, wherein the first web page has a first Uniform Resource Locator (URL);
   based on evaluating the first URL against a plurality of fingerprints defined for web pages of the target vendor, identifying a match between the first URL and a first fingerprint of the plurality of fingerprints;
   determining a first type of security overview to generate for a user of the vendor associated with the account based on the identified match between the first URL and the first fingerprint;
   retrieving first security information maintained by the security vendor for the account with the target vendor corresponding to the first type of security overview, wherein the first security information comprises at least one of security data and security metadata maintained by the security vendor for the account;
   generating a security overview of the first type from the first security information, wherein generating the security overview comprises modifying the first web page to incorporate the first security information, wherein modifying the first web page generates a modified web page; and
   rendering the modified web page, wherein rendering the modified web page renders the security overview alongside content of the first web page.

2. The method of claim 1, wherein rendering the security overview with the first web page displays the security overview rendered with the first web page on a single graphical user interface (GUI).

3. The method of claim 1, wherein the plurality of fingerprints comprises a plurality of URL patterns determined from URLs of the web pages of the target vendor, and wherein identifying the match between the first URL and the first fingerprint comprises identifying a match between the first URL and a corresponding one of the plurality of URL patterns.

4. The method of claim 3, wherein each of the plurality of URL patterns comprises a variable name, and wherein determining the first security overview type to generate comprises determining a substring of the first URL that matches to a first variable name of the corresponding one of the plurality of URL patterns.

5. The method of claim 4, wherein the first variable name corresponds to a name of a service of the target vendor, and wherein the first security overview type comprises a security overview of the service of the target vendor.

6. The method of claim 1, wherein generating the security overview comprises at least one of summarizing and aggregating at least a subset of the first security information, and wherein generating the security overview from the first security information comprises generating the security overview from the at least one of the summarized and aggregated subset of the first security information, and wherein modifying the first web page to incorporate the first security information comprises modifying the first web page to incorporate the at least one of the summarized and aggregated subset of the first security information.

7. The method of claim 1, wherein modifying the first web page to incorporate the first security information comprises modifying a HyperText Markup Language (HTML) or Extensible Markup Language (XML) document of the first web page through a Document Object Model (DOM) of the HTML or XML document.

8. The method of claim 1 further comprising:
based on detecting selection of an element of a second web page during the login session, determining a resource provisioned for the account to which the selected element corresponds based on a syntactic pattern of an HTML or XML document of the second web page that corresponds to the selected element and that matches to a second fingerprint of the plurality of fingerprints, wherein the plurality of fingerprints comprise one or more syntactic patterns defined for elements of the web pages of the target vendor;
retrieving second security information maintained by the security vendor for the resource;
generating a second security overview of the resource based on the second security information; and
rendering the second security overview of the resource for displaying alongside the second web page.

9. The method of claim 8, wherein the syntactic pattern comprises at least one of an XML Path Language (XPath) expression and a jQuery selector that corresponds to a node of the HTML or XML document of the second web page, and wherein the node comprises an attribute having an indication of the resource as a value.

10. The method of claim 1, wherein the target vendor comprises a cloud service provider or a Software-as-a-Service (SaaS) provider, and wherein the account is with the cloud service provider or the SaaS provider.

11. The method of claim 1 further comprising determining the account that is associated with the login session, wherein determining the account comprises at least one of determining the account based on first account information associated with the login session and determining the account based on second account information located on the first web page.

12. One or more non-transitory computer-readable media having program code stored thereon, the program code comprising instructions to:
integrate, by a browser extension provided by a security vendor, security data and metadata maintained by the security vendor for an account with a target vendor with requested web pages of the target vendor, wherein the instructions to integrate security information maintained by the security vendor with requested web pages of the target vendor comprise instructions to,
detect a first event initiated by a user that has requested a first web page of a target vendor, wherein the first event comprises retrieval of the first web page by a web browser or selection of an element of the first web page by the user;
determine which subset of a plurality of security data and metadata maintained for the account with which the user is associated should be retrieved based on the first event, wherein the instructions to determine which subset of the plurality of security data and metadata should be retrieved comprise instructions to determine a match of a uniform resource locator (URL) of the first web page or the selected element of the first web page to one of a plurality of patterns defined for web pages of the target vendor, wherein the security vendor maintains the plurality of security data and metadata for the account with the target vendor;
retrieve the determined subset of security data and metadata based on the one of the plurality of patterns to which the URL or the element of the first web page matched;
modify the first web page to integrate the determined subset of security data and metadata into the first web page for rendering; and
render the modified first web page, wherein rendering the modified first web page renders the determined subset of security data and metadata alongside content of the first web page.

13. The non-transitory computer-readable media of claim 12, wherein the first event comprises retrieval of the first web page, and wherein the instructions to determine the match of the URL of the first web page to one of the plurality of patterns comprise instructions to:
match the URL of the first web page to a first URL pattern of a plurality of URL patterns included in the plurality of patterns, wherein the first URL pattern comprises a variable name, and wherein a first substring of the URL matches to a position of the variable name,
wherein the instructions to determine the subset of security data and metadata comprise instructions to determine the subset based on the first substring of the URL.

14. The non-transitory computer-readable media of claim 12, wherein the first event comprises selection of the element of the first web page, and wherein the instructions to determine the match of the selected element to one of the plurality of patterns comprise instructions to evaluate a markup language document of the first web page based on a first expression describing a location in the markup language document of an indication of a resource corresponding to the selected element, wherein the plurality of patterns comprises the first expression, and wherein the resource is a resource provisioned for the account with the target vendor.

15. The non-transitory computer-readable media of claim 14, wherein the instructions to evaluate the markup language document of the first web page comprise instructions to evaluate a HyperText Markup Language (HTML) or an Extensible Markup Language (XML) document, and wherein the first expression comprises at least one of an XPath expression and a jQuery selector.

16. The non-transitory computer-readable media of claim 14, wherein the instructions to retrieve the subset of security data and metadata comprise instructions to retrieve security data and metadata maintained for the resource based on the indication of the resource corresponding to the selected element.

17. The non-transitory computer-readable media of claim 12, wherein the instructions to modify the first web page to integrate the determined subset of security data and metadata into the first web page for rendering comprise instructions to modify an HTML or XML document of the first web page to incorporate the determined subset of security data and metadata through a Document Object Model (DOM) of the HTML or XML document.

18. An apparatus comprising:
   a processor; and
   a non-transitory computer-readable medium having instructions stored thereon that are executable by the processor to cause the apparatus to,
      integrate, by a browser extension provided by a security vendor, security information maintained by the security vendor for an account with a target vendor with requested web pages of the target vendor, wherein the instructions executable by the processor to cause the apparatus to integrate security information maintained by the security vendor with requested web pages of the target vendor comprises, by the browser extension,
         detect a request for a first web page of the target vendor during a login session of an account with the target vendor, wherein the first web page has a first Uniform Resource Locator (URL);
         based on evaluation of the first URL against a plurality of patterns defined for web pages of the target vendor, identify a match between the first URL and a first pattern of the plurality of patterns;
         determine a first subset of security information maintained for the account to retrieve based on the first pattern to which the first URL matched, wherein the security information maintained for the account comprise at least one of security data and security metadata maintained for the account by the security vendor;
         retrieve the first subset of the security information determined based on the first pattern;
         modify the first web page to integrate the first subset of the security information into the first web page as a first security overview for content of the first web page, wherein modification of the first web page generates a modified web page; and
         render the modified web page, wherein rendering the modified web page renders the first subset of security information alongside the content of the first web page.

19. The apparatus of claim 18, wherein each of the plurality of patterns comprises a variable name indicative of which of the security information to retrieve, and wherein the instructions executable by the processor to cause the apparatus to determine the first subset of the security information comprise instructions executable by the processor to cause the apparatus to determine a substring of the first URL that matches to a first variable name of the first pattern.

20. The apparatus of claim 18 further comprising instructions executable by the processor to cause the apparatus to:
   based on detection of selection of an element of a second web page, evaluate markup language of the second web page to determine a resource to which the selected element corresponds based on matching the element to a second pattern of the plurality of patterns, wherein the resource was provisioned for the account with the target vendor;
   based on retrieval of a second subset of the security information that corresponds to the resource, generate a second security overview of the resource based on the second subset of the security information; and
   integrate the second security overview comprising the second subset of the security information into the second web page as the second security overview for the resource.

21. The apparatus of claim 20, wherein the instructions executable by the processor to cause the apparatus to evaluate the markup language of the second web page comprise instructions executable by the processor to cause the apparatus to evaluate at least one of an Extensible Markup Language Path Language (XPath) expression and a jQuery selector defined for the target vendor, wherein the at least one of the XPath expression and the jQuery selector evaluates to or selects a node of the markup language of the second web page that comprises an indication of the resource.

22. The apparatus of claim 18, wherein the instructions executable by the processor to cause the apparatus to modify the first web page to integrate the first subset of the security information into the first web page comprise instructions executable by the processor to cause the apparatus to modify a Hypertext Markup Language (HTML) or Extensible Markup Language (XML) document of the first web page to include the first subset of the security information through a Document Object Model (DOM) of the HTML or XML document.

* * * * *